Patented Sept. 21, 1954

2,689,858

UNITED STATES PATENT OFFICE 2,689,858

ORGANOTITANIUM POLYMERS

Thomas Boyd, Springfield, Mass., assignor to Monsanto Chemical Company, St. Louis, Mo., a corporation of Delaware No Drawing. Application January 25, 1952,
Serial No. 268,341

12 Claims. (Cl. 260—429)

This invention relates to polymers of organic derivatives of orthotitanic acid and to a process for preparing them. More particularly the invention relates to a process for preparing polymers of organic derivatives of orthotitanic acid which are soluble in organic media.

This application is a continuation-in-part of application S. N. 122,844, filed October 21, 1949, in the name of Thomas Boyd, now abandoned.

Monomeric organic derivatives of orthotitanic acid are well-known compounds. They are extremely sensitive to water and hydrolyze quickly into titanium dioxide on exposure to water. In the copending application, it is disclosed that polymeric forms of the organic derivatives may be prepared by reacting monomers with restricted quantities of water.

However, even when restricted quantities of water are used, the product may be a mixture of a polymer of the organic derivative and a colloidal form of titanium dioxide. This is evidenced by the appearance of a white cloud in the reaction medium which disperses rapidly in the polymer as it is formed. Such a mixture is quite hazy and in some cases even milky in appearance indicating that the product is not soluble either in the polymer or in organic solvents.

One object of this invention is to provide organic solvent-soluble polymers of organic derivatives of orthotitanic acid.

Another object is to provide a process for preparing a homogeneous polymer of an organic derivative of orthotitanic acid, said polymer being soluble in organic media.

A further object is to provide a process for suppressing the formation of titanium dioxide during the polymerization of organic derivatives of orthotitanic acid.

These and other objects are attained by reacting organic derivatives of orthotitanic acid with restricted amounts of water under such conditions that substantially no titanium dioxide is formed.

The following examples are given in illustration and are not intended as limitations on the scope of this invention. Where parts are mentioned they are parts by weight.

Example I

Dissolve 1 mol of tetrabutyl orthotitanate in 10 mols of anhydrous butanol. Add dropwise to the resultant solution, a mixture of 0.9 mol of water in 4 mols of butanol. Maintain the solution at 30° C. and under constant and vigorous agitation throughout the addition of the butanol-water mixture. Continue the vigorous agitation for about 30 minutes after the last addition of mixture. Remove the solvent by distillation under vacuum. The product is a clear transparent liquid having a viscosity of 5–25 poises at 25° C. Its boiling point is above its decomposition temperature.

The tetrabutyl orthotitanate monomer has a viscosity of less than 500 centipoises and a boiling point of 134–6° C. at 0.5–1 mm. mercury absolute pressure.

Example II

To an anhydrous butanol solution of 1 mol of monomeric tetrabutyl orthotitanate, add dropwise a mixture of 0.5 mol of water in 2 mols of butanol accompanied by vigorous agitation at a temperature of about 30° C. Continue the agitation for a short time after the last addition of water-butanol mixture and then remove the solvent by vacuum distillation. The product is a dimer of tetrabutyl orthotitanate having a viscosity of about 500 centipoises. The dimer was free from haze.

Example III

Dissolve 1 mol of tetrabutyl orthotitanate in 10 mols of anhydrous butanol. To this solution, add a mixture of 0.95 mol of water in 4 mols of butanol. The mixture should be added dropwise accompanied by vigorous agitation. The rate of addition should be controlled so that no white cloud or precipitate is discernible as each drop of butanol-water mixture enters the reaction solution. After all of the mixture has been added, raise the temperature of the reaction medium to 55–60° C. and maintain the reaction medium at this temperature for about one hour with continued vigorous agitation. Then remove the solvent by distillation under vacuum. The product is an extremely viscous transparent haze-free polymer containing about 10 monomer units per polymer chain.

Example IV

Dissolve 1 mol of tetraphenyl orthotitanate in about 3 mols of anhydrous benzene. To this solution add dropwise a mixture of 0.8 mol of water in about 3.5 mols of butanol at 50° C. Stir the reaction medium constantly throughout the addition of the water-butanol mixture. Remove the benzene and butanol by distillation under vacuum. The product is a tough amber solid having no definite melting point. It cannot be distilled without decomposition. Monomeric tetraphenyl orthotitanate has a sharp melting point at 153–154° C.

*Example V*

Dissolve 1 mol of tetra-(2-ethyl hexyl) orthotitanate in 3 mols of anyhdrous hexane. Prepare a mixture of 0.9 mol of water in 4 mols of butanol. Add the butanol-water mixture to the hexane solution of the orthotitanate. The addition should be made by the slow addition of droplets of the butanol-water mixture and should be accompanied by vigorous stirring. After all the water-butanol mixture is added, continue stirring for a few minutes, then distill the reaction product under vacuum to recover the hexane and butanol. The product is a viscous liquid which cannot be distilled without decomposition.

*Example VI*

Prepare a mixed anhydride of orthotitanic acid and acetic acid by reacting 1 mol of titanium disulfide with 4 mols of acetic acid under anhydrous conditions. Dissolve 1 mol of the product in 4 mols of anhydrous benzene and add to the solution thus formed 0.9 mol of water mixed with 4 mols of butanol. The addition should be made dropwise and should be accompanied by constant vigorous agitation. After vacuum distillation of the reaction medium, a white, waxy solid polymerization product is obtained. The solid was soluble in aliphatic acid aromatic hydrocarbons and in many alcohols.

*Example VII*

Dissolve 1 mol of a mixed anhydride of orthotitanic acid and phthalic acid (titanium tetraphthalate) in 6 mols of anhydrous benzene. To this solution add slowly a mixture of 0.9 mol of water in 4 mols of butanol with constant agitation. Distill off the benzene and butanol under vacuum. The product is a waxy white solid having physical properties quite different from those of the monomer. The solid is soluble in common organic solvents.

*Example VIII*

Prepare a monomeric tetra-amide of orthotitanic acid and aniline by reacting 1 mol of titanium disulfide with 4 mols of aniline under substantially anhydrous conditions at about 70° C. Dissolve 1 mol of the monomer in 10 mols of hot carbon tetrachloride. Add slowly to the hot solution 0.9 mol. of water mixed with 4 mols of butanol. Maintain constant agitation during the addition of the butanol-water mixture. Remove the carbon tetrachloride and butanol by vacuum distillation. The product is a waxy amorphous solid.

*Example IX*

Prepare monomeric tetrabutyl amide of orthotitanic acid by reacting 1 mol of titanium disulfide with 4 mols of n-butyl amine under anhydrous conditions at 80° C. It is a colorless liquid of relatively low viscosity. Dissolve 1 mol of the amide in 10 mols of anhydrous benzene and add thereto slowly 0.9 mol of water mixed with 4 mols of butanol. The addition should be made dropwise accompanied by constant agitation. Distill under vacuum to remove the benzene and butanol. The residue in the reaction vessel is a soft waxy polymer of tetrabutyl amide of orthotitanic acid.

*Example X*

Dissolve 1 mol of tetrabutyl orthotitanate in 10 mols of xylene. Add to this solution, 1.5 mols of water mixed with 6 mols of butanol. The addition should be made slowly accompanied by constant agitation. Near the end of the reaction, extreme care must be used in the addition of the water-butanol mixture to prevent the precipitation of coloidal titanium dioxide. Remove the butanol and xylene by vacuum distillation. The product is an amorphous solid.

The polymers of this invention are prepared by the controlled addition of water to monomeric tetra-organo derivatives of orthotitanic acid. The ratio of water to monomer may be varied from 0.5:1 to 1.6:1 on a molar basis. Outside of these ranges, the polymeric products of this invention are not produced. Extreme care must be used in the addition of the water to the monomer, since too rapid addition in localized areas will produce titanium dioxide. To obtain the polymers, two conditions must be met, i. e., the monomer must be dissolved in at least 3 mols of an organic anhydrous solvent per mol of monomer and the water must be mixed with an organic solvent compatible with the solvent for the reaction.

The monomer may be dissolved in any anhydrous organic medium which is a solvent therefor. Conveniently, many of the monomers are prepared in an excess of an organic solvent such as butanol and need not be recovered therefrom before the addition of the water. The amount of solvent must be at least 3 and preferably about 10 mols per mol of monomer. Since most of the monomers are soluble in a large variety of organic liquids, such solvents as alcohols, ethers, hydrocarbons, chlorinated hydrocarbons, etc. may be used.

The water should be diluted or mixed with an organic liquid which is miscible therewith to the extent of at least about 5–10% by weight and also is miscible with the solvent for the monomer. No more than 10% of water should be present in the organic medium and for some liquids such as ethanol, even 5% by weight is too much, unless the dilution of the monomer in the organic solvent is greater than 1 mol in 10 mols of solvent. The limit of the concentration of water for each solvent may be easily determined by adding a drop of the water-containing liquid to the monomer solution. If a white precipitate appears, the concentration of the water in the solvent is too great.

The addition of the water-solvent mixture must be accompanied by vigorous agitation and must be accomplished quite slowly even when appropriate dilutions of the monomer and water are used. The agitation must be sufficient to disperse the water substantially instantaneously through the monomer solution. The rate of addition of the water must be slow enough to prevent the formation of titanium dioxide. Advantageously, this is carried out by adding the organic solvent containing the required amount of water in small droplets to the monomer solution.

The polymers range from liquids to hard solids depending on the starting derivative of orthotitanic acid and on the amount of water used. They are soluble in most common organic solvents such as aromatic and aliphatic hydrocarbons, alcohols, ketones, chlorinated hydrocarbons, etc. In general, if 0.5 mol of water per mol of derivative is used, the product is essentially a dimer. As more water is used longer straight chain polymers are formed until the amount of water becomes greater than 1 mol per mol of orthotitanic acid derivative. At this point a substantial amount of crosslinking takes place without causing the polymer to become insoluble in organic solvents, the viscosity of the polymers rises abruptly and the majority of the resulting polymers are solids.

The derivatives of orthotitanic acid which may be polymerized according to this invention are the tetra esters thereof formed from alcohols or phenols, the mixed anhydrides thereof formed from organic acids, and the amides and imides thereof formed from primary and secondary amines. A large number of the monomeric compounds are known and have been prepared by condensation of a titanium tetrahalide with an alcohol, phenol, acid, amine or imine. The monomers may also be prepared by reaction of titanium disulfide with the alcohol or phenol, acid, amine or imine under anhydrous conditions as set forth in my copending applications Ser. Nos. 122,841, now U. S. 2,579,414; 122,842, now U. S. 2,630,443; and 122,843, now U. S. 2,579,413, respectively, filed October 21, 1949.

Thus, the tetra esters are derived from mono- and polyhydroxy alcohols and phenols, including amino, nitro, halogeno, etc. substituted alcohols and phenols. Examples of the alcohols and phenols which may be used are methanol, ethanol, propanol, isopropanol, butanol, isobutanol, tertiary butyl alcohol, amyl alcohol, octyl alcohols, cetyl alcohol, lauryl alcohol, stearyl alcohol, oleyl alcohol, allyl alcohol, methallyl alcohol, and other alkenyl alcohols, benzyl alcohol, amino alcohols such as ethanol amine, triethanolamine, nitro alcohols such as nitrobutanol, tris hydroxymethyl nitromethane, halogeno alcohols such as chlorethanol, bromobutanol, polyhydric alcohols such as glycols, including the glycol esters such as diethylene glycol, glycerol, sorbitol, mannitol, etc., phenol, p-chlorophenol, m-nitrophenol, aminophenols, cresols, xylenols, resorcinol, catechol, phlorglucinol, phenethyl phenol, etc.

The mixed anhydrides are derived from mono- or polycarboxylic acids which may be saturated or unsaturated. Furthermore, the acids may be substituted in the side chain by various substituents such as halogen, hydroxyl, amino, nitro, etc. groups. The acids may be straight chain or branched chain and may be cyclic or heterocyclic. Among the acids which may be used are acetic, propionic, butyric, isobutyric, pentanoic, lauric, stearic, phthalic, tricarballylic, malonic, glutaric, mellitic, suberic, succinic, acrylic, methacrylic, crotonic, atropic, maleic, fumaric, citraconic, aconitic, tiglic, oleic, elaidic, behenic, propiolic, chloracetic, trichloracetic, lactic, salicylic, aminobutyric, nitrobutyric, benzoic, naphthoic, toluic, campholic camphoric, pyromucic, thiophene carboxylic, picolinic, quinolinic, etc. acids.

The tetra-amides are derived from primary or secondary saturated and unsaturated aliphatic, aromatic or cyclic amines. Examples of the amines from which the tetra-amides may be derived include ethyl amine, propyl amine, butyl amine, isobutyl amine, t-butyl amine, pentyl amines, octyl amines, lauryl amines, aniline, toluidine, benzyl amine, phenethyl amine, cyclohexyl amine, diethyl amine, dibutyl amine, dicyclohexyl amine, pyridine, quinolines, etc.

The polymers of organic derivatives of orthotitanic acid may be used as modifiers for condensation resins such as phenolic-, urea- and melamine-aldehyde resins. They tend to speed up the cure of said resins and produce a tougher product especially when used in film forming compositions. The polymers are particularly advantageous for treating textile fabrics to render them water repellent. The repellency obtained is nearly 100% even when the impregnated fabric is immersed in water for 24 hours or more and it is resistant to repeated laundering and dry cleaning.

It is obvious that many variations may be made in the processes and products of this invention without departing from the spirit and scope thereof as defined in the appended claims.

I claim:

1. A process for preparing organic solvent soluble polymers of tetra-organo derivatives of orthotitanic acid, which comprises dissolving 1 mol of a monomeric tetra-organo derivative of orthotitanic acid in at least 3 mols of an anhydrous organic solvent and adding slowly to the solution thus formed a mixture of water in an organic solvent miscible with the solvent for the monomer, the rate of addition of the mixture being slow enough to prevent the formation of colloidal titanium dioxide, the amount of water in the mixture added being less than 10% by weight of the mixture and the total amount of water added being in the molar ratio of from 0.5:1 to 1.6:1 with respect to the monomer, the addition of the water mixture to the monomer solution being accompanied by constant vigorous agitation, said tetra-organo derivative of orthotitanic acid being taken from the group consisting of esters of orthotitanic acid, organic amides of orthotitanic acid and mixed anhydrides of orthotitanic acid and an organic carboxylic acid.

2. A process as in claim 1 wherein the tetra-organo derivative of orthotitanic acid is a tetraalkyl derivative thereof.

3. A process as in claim 2 wherein the tetraalkyl derivative is tetrabutyl orthotitanate.

4. A process as in claim 2 wherein the tetraalkyl derivative is tetra(2-ethyl hexyl) orthotitanate.

5. A process as in claim 1 wherein the tetra-organo derivative of orthotitanic acid is a mixed anhydride of orthotitanic acid and an organic acid.

6. A process as in claim 5 wherein the mixed anhydride is tetra-acetyl orthotitanate.

7. A process as in claim 1 wherein the tetra-organo derivative of orthotitanic acid is a tetraamide of orthotitanic acid.

8. A process as in claim 7 wherein the tetraamide is the tetra-anilide of orthotitanic acid.

9. A process as in claim 7 wherein the tetraamide is the tetra-n-butyl amide of orthotitanic acid.

10. An organic solvent soluble titanium dioxide-free polymer of a monomeric tetra-organoamide of orthotitanic acid, said polymer having been prepared by dissolving 1 mol of the monomer in at least 3 mols of an anhydrous organic solvent and adding slowly to the solution thus formed a mixture of water with an organic solvent miscible with the solvent for the monomer, the rate of addition of the mixture being slow enough to prevent the formation of colloidal titanium dioxide, the amount of water in the mixture added being less than 10% by weight of the mixture and the total amount of water added being in the molar ratio of from 0.5:1 to 1.6:1 with respect to the monomer, the addition of the water mixture to the monomer solution being accompanied by constant and vigorous agitation.

11. A polymer as in claim 10 wherein the tetraamide is the tetra-anilide.

12. A polymer as in claim 10 wherein the tetraamide is the tetra-n-butyl amide.

(References on following page)

References Cited in the file of this patent

UNITED STATES PATENTS

| Number | Name | Date |
|---|---|---|
| 2,398,672 | Sauer | Apr. 16, 1946 |
| 2,467,177 | Zimmer | Apr. 12, 1949 |
| 2,489,651 | Langkammerer | Nov. 29, 1949 |
| 2,547,944 | Iler | Apr. 10, 1951 |
| 2,566,363 | Pedlow | Sept. 4, 1951 |
| 2,621,193 | Langkammerer | Dec. 9, 1952 |
| 2,621,195 | Haslam | Dec. 9, 1952 |

FOREIGN PATENTS

| Number | Country | Date |
|---|---|---|
| 125,450 | Australia | Sept. 25, 1947 |

OTHER REFERENCES

Boyd: J. of Polymer Science, vol. 7, December 1951, pages 591 to 602.

Winter: J. Oil and Colour Chemists' Assoc., vol. 34, 1951, pages 30 to 35.

Kraitzer et al.: J. Oil and Colour Chemists' Ass'n, vol. 31, No. 340, 1948, pp. 405 to 409.